Sept. 10, 1929.    P. L. TENNEY    1,727,622
TRANSMISSION WITH CONTROL AT SIDE
Filed March 4, 1927    3 Sheets-Sheet 2

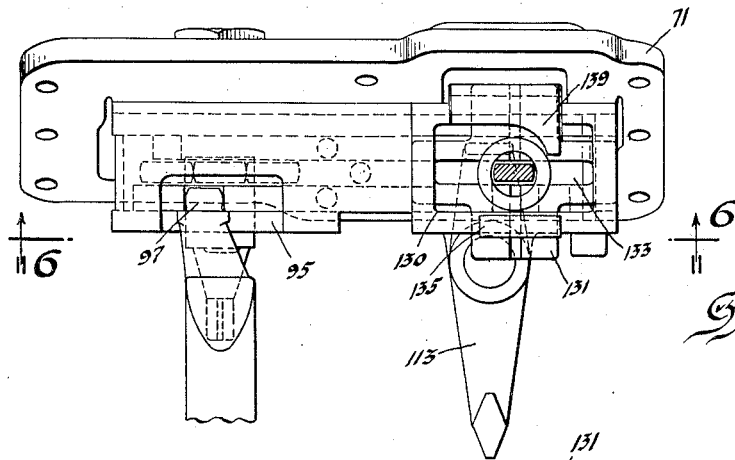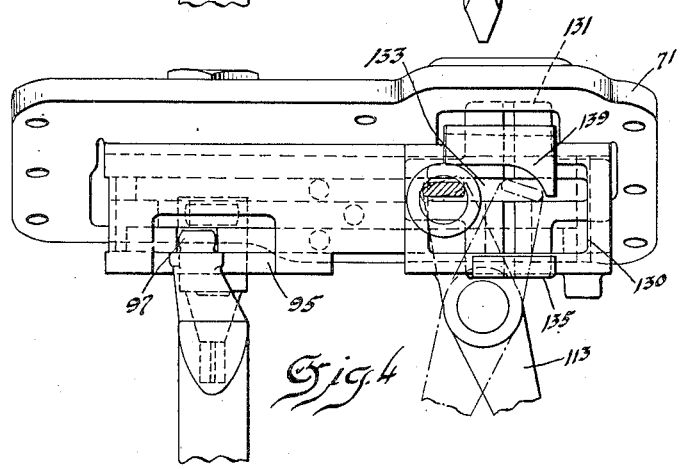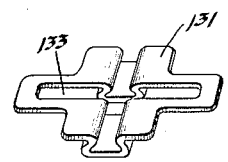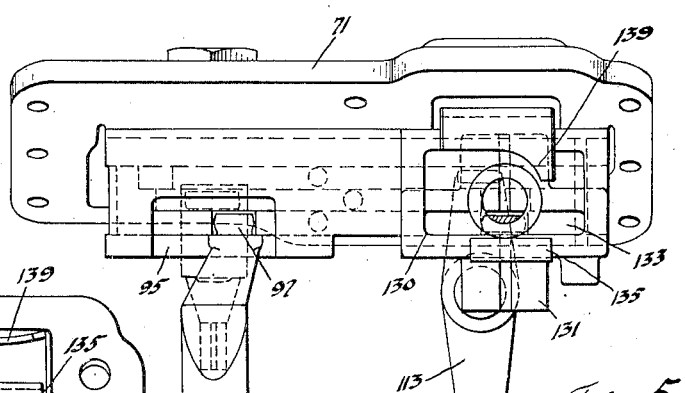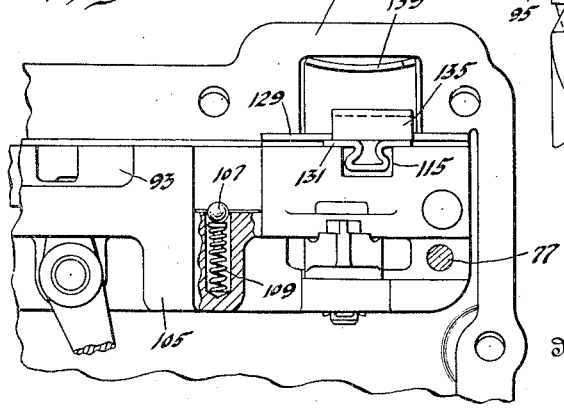

Patented Sept. 10, 1929.

1,727,622

UNITED STATES PATENT OFFICE.

PERRY L. TENNEY, OF MUNCIE, INDIANA, ASSIGNOR TO GENERAL MOTORS CORPORATION, OF DETROIT, MICHIGAN, A CORPORATION OF DELAWARE.

TRANSMISSION WITH CONTROL AT SIDE.

Application filed March 4, 1927. Serial No. 172,729.

This invention relates to power transmission and is more particularly concerned with mechanism for operating a variable speed gearing for motor vehicles.

An object of the invention is to provide an improved operating means for a change speed gear mechanism.

Another object is to provide a unitary assembly carrying relatively movable parts which, when the assembly is positioned upon the gear housing, engages the operating lever and the gears.

Another object is to more conveniently position the operating lever for the gear shift device.

As another object the invention aims to do away with that part of the gear housing which usually projects through the floor of the car.

The invention also provides for a more advantageous position of the brake lever.

Other objects and advantages will be obvious upon a reading of the following description and an examination of the accompanying drawing.

In the drawing:

Figure 3 is a plan view within the housing substantially on the line 3—3 of Figure 2, the parts being shown in neutral.

Figure 4 is a similar view showing the shift mechanism in position for third speed.

Figure 5 is a similar view showing the parts in position for driving in reverse.

Figure 6 is a view in elevation substantially on the line 6—6 of Figure 3, parts being shown in section to show the detent device.

Figure 8 is a perspective of the interlocking plate.

Figure 1:
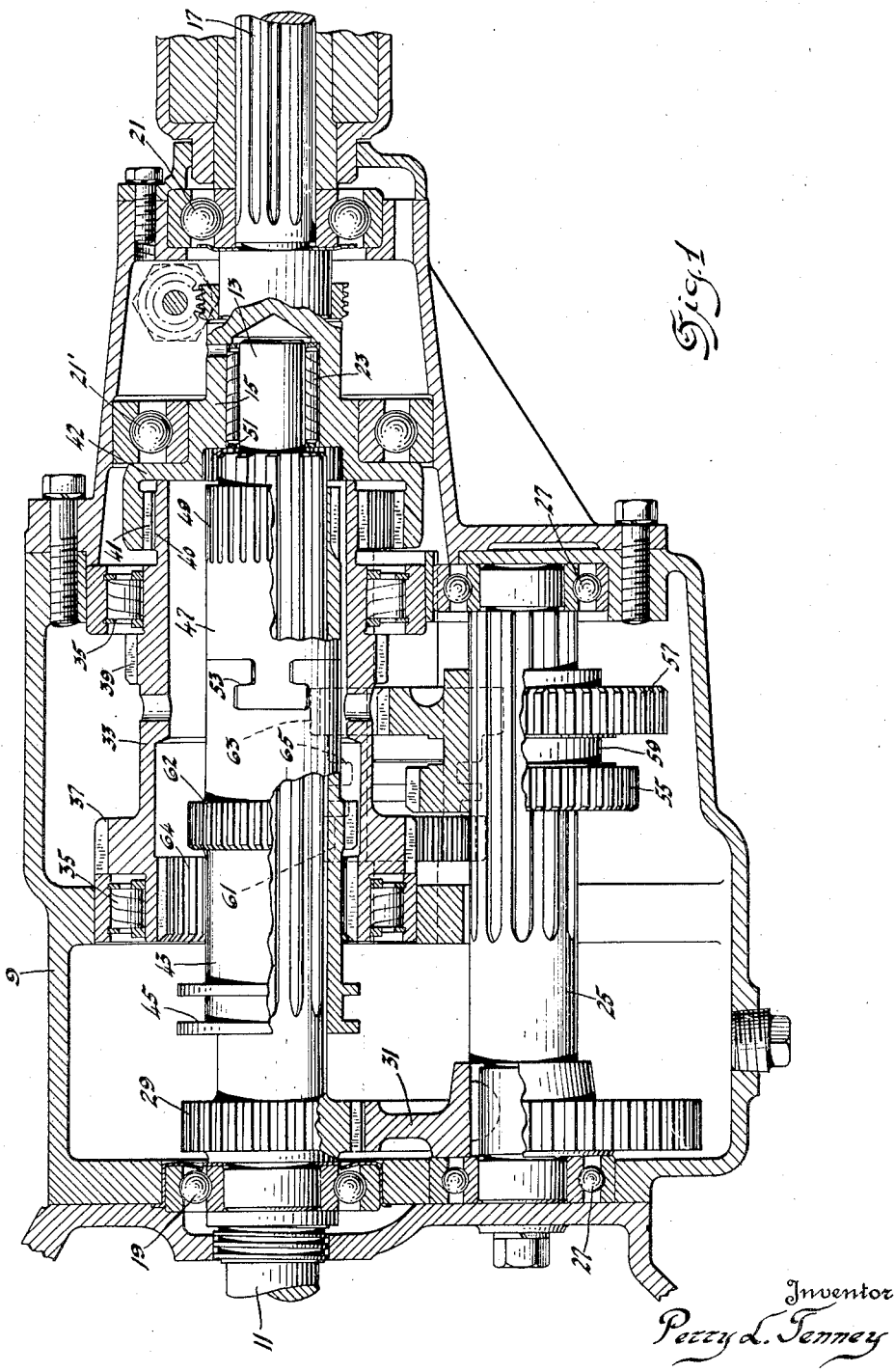
Figure 1 is a vertical longitudinal section through the transmission.

Referring by reference characters to the drawing and first to Figure 1, the gear housing is designated by numeral 9. Numeral 11 is the driving shaft extending to an end 13 within an enlarged open end 15 of driven shaft 17. Shafts 11 and 17 are provided with bearings 19, 21 and 21', respectively, as illustrated. Roller bearings 23 are made use of between the adjacent ends of the shafts, which roller bearings are in radial alignment with bearings 21' to afford a sufficient support for the shafts.

A countershaft 25 beneath the aligned shafts 11 and 17 is journalled by means of bearings 27. Ears 29 and 31 on the driving shaft and the countershaft effect the rotation of the countershaft. Eccentrically surrounding the driving shaft is a gear sleeve 33 rotatable within housing bearings 35. This sleeve has an external gear 37 just to the rear of the front bearings, a second external gear 39 just in front of the rear bearing 35, and a third external gear 40 just to the rear of the second bearing 35, which third gear is in driving engagement with an internal gear 41 carried by a flanged extension of the driven shaft as at 42. Slidable on the driving shaft, which is splined to permit such movement, is a double sleeve composed of a front part 43 having a collar 45 and a rear part 47 having external clutch teeth 49 to engage clutch teeth 51 on the driven shaft within the flange 42. The two sleeve portions are made separate for convenience in assembly and are operatively interlocked by a dovetail connection shown at 53.

The countershaft has a double gear comprising gears 55 and 57 with a collar 59 therebetween. Gear 55 is at times to engage gear 37 and gear 57 is to engage gear 39. These gear engagements afford low speed and second speed.

Adjacent one side, the right side, of the gear housing and shown by dotted lines on Figure 1, is a sliding idler gear which is composed of two gears 61 and 63. The former to engage gear 37 on the eccentric ring and the latter to engage gear 57 on the countershaft. For making the shift to effect engagement the double gear has a collar 65. Figure 1 illustrates the idler gear in its active position.

Shifting the double sleeve comprising sleeve members 43 and 47 gives a direct fourth speed and a third speed drive, the latter being accomplished when external gear 62 on sleeve 43 is engaged with internal gear 64 on the eccentrically mounted ring. Shifting the pair of gears 55 and 57 on the countershaft gives the drive in low gear or second speed. Shifting the pair of gears constituting the reverse idler gives a drive in reverse.

Such shifting of gears is frequently made by forks extending down to the several collars from shifter rods or rails slidably mounted in the top of the housing. The housing is usually made with a dome shaped portion extending up through the floor of the car between the right and left front seats, the dome housing the conventional shift lever. In my invention I do away with the dome and provide means carried by a cover plate on the left side of the housing for slidably carrying the shift rails. The gear shift lever extends through a suitable opening in the floor board and into the top of the housing, its end adjacent the side cover where it operatively engages the rails. It will thus be seen that the shift lever is moved toward the left from the usual mid position, thus being in a more convenient position for the operator of the car and out of the way of the passenger occupying the right front seat. If desired, the emergency brake lever may be fulcrumed on the housing above the cover, thereby removing both levers from a position where they may annoy passengers on the front seat. These features are perhaps best shown on Figure 2.

Figures 2, 7:
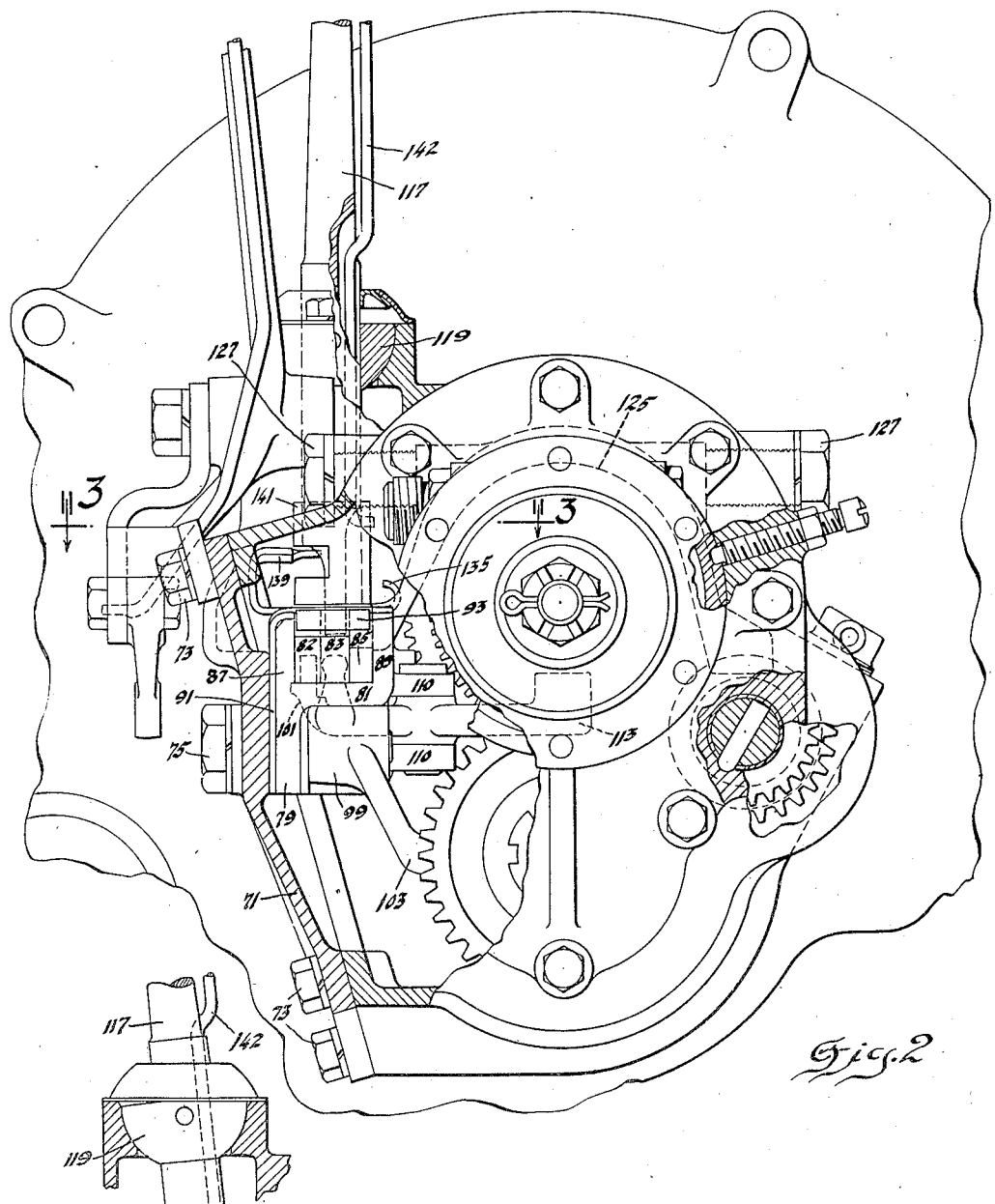
Figure 2 is a view in elevation, parts being broken away and in section.
Figure 7 is a vertical section illustrating a detail.

Referring to Figure 2, and also to Figures 3 to 6, numeral 71 is a cover for a housing opening on the left side of the transmission casing. This cover is conveniently secured in position by bolts 73. Bolts 75 and 77 pass through the cover and secure a casting 79 to the cover, which casting will be designated as the shift rail guide. This shift rail guide has a horizontal floor portion 81 for three shift rails 82, 83, 85. It has a vertical wall 87 adjacent the cover and a spaced vertical wall 89, the rods 82, 83, 85 being thus housed on three sides by the floor 81 and the vertical walls 87 and 89. Between the cover and the casting 79 is secured a plate 91, which plate is bent over the top of the casting 79 and covers the shift rails. This plate 91 will be called the shift rail cover. At its rear end it is bent down at 93 to limit the rearward movement of the several rails. Just forward of the rear end of the rail guide a U-shaped part is cut out at 93 and the rail cover is similarly cut at 95. A notch 97 is cut into the upper surface of the innermost rail and the cutting away of the rail and guide make it possible for the reverse idler yoke (to be described latter) to enter this notch.

Bolt 75 is extended beyond the vertical wall of the casting 79 to form a journal for rotating sleeve 99. From sleeve 99 extends an upwardly directed arm 101 engaging a suitable notch in the middle rail, the floor of the guide being cut away to permit the passage of this arm 101 into the notch. Also from this sleeve there extends inwardly and downwardly an arm 103 terminating in a diamond shaped projection entering collar 59 of the second and low speed gears on the countershaft.

The floor portion of the casting 79 is downwardly extended as shown at 105 in Figure 6 and three detents are suitably positioned therein, as shown by dotted lines in Figures 3, 4, and 5, one detent for each rod. One of these detents is illustrated in Figure 6 and designated by numeral 107, its spring being given numeral 109. Inwardly directed lugs 110 project from the lowermost part of the outer wall 87 and from the floor portion 81 at a point near the front end of the rail guide. These lugs serve to pivot lever 113. The lever extends inwardly, terminating the diamond shaped end engaging collar 45 of the third and fourth speeds. The lever extends outwardly beneath the floor portion 81 and toward the cover where it is formed or provided with an upwardly extending lug passing through a suitable floor opening and enters a recess in the outermost rail. Into the top of the inner wall 89 of the rail guide substantially above the lugs 110 is cut a rectangular recess 115 and when the several rails are in their neutral position the recess registers with rectangular notches, one in each rail.

The shift lever 117 has a ball joint at 119 at the left side of the housing, so that, as usual, it may be rocked to move its lower end 121 both longitudinally and transversely. When the rails are in neutral the several notches are in a position to be engaged by the lower end 121 of lever 117 as the lever is rocked transversely. If the lever is shifted transversely to engage the outermost rail 82, forward and rearward movement at the knob end of the lever will give third and fourth speeds, respectively. If the end of the lever is engaged in the notch of the middle rail forward and rearward movements at the knob end of the lever will give low and second speeds. The shifting system for second, third and fourth, therefore, conforms to the conventional standard shift for low, second, third speeds. For reverse the lever is shifted transversely into the notch of the innermost rod, as shown in Figure 7. A curved yoke 125 straddles the aligned shafts and the countershaft and is pivoted at two symmetrical points on its arc by pivot pins 127. The left end of this yoke has a lug entering the notch in the rear end of the inner-most rail, as explained. The right end of the yoke has an operating part, preferably corresponding to the diamond shaped lug shown on lever 113 engaging the collar 65 of the reverse idler. When the shift lever is moved rearwardly, at the knob end, the rail is moved forwardly and effects the gear engagement shown by dotted lines in Figure 1, for driving in reverse.

An interlock to prevent the shifting of more than one rail at a time has been arranged as follows. The plate 91, when bent over the rail guide and rails toward the front of the rail guide, is spaced somewhat above the rails and guide, as shown at 129 in Figure 6. In this raised portion of the plate is a large opening 130 giving access to the several rail notches. Through this large opening extends the lower end of the shift lever. The interlocking device is a stamped plate having the form shown by Figure 8. This plate 131 is guided by engagement of its upper surface with the under surface of plate 129. It has a long slot 133 which may register with, but is longer than any one of the rail notches. The lateral movement of the interlock plate is accomplished by the lateral movement of the shift lever, the walls of the slot 133 being engaged by the lever. Beneath the flat portion of the interlocking plate it is formed centrally as shown in Figures 6 and 8, and the lower portion is slidable transversely through the rail notches and the slot 115 in the rail guide. As the lever shifts transversely to locate its end in the notches of any one of the three rails the interlocking plate is similarly moved laterally guided by the cover plate 129 and the rail guide, and also by the rail notches. When the lower end of the lever is in a rail notch the slot 133 permits the lever to move that rail but the lower part of the interlocking plate is in engagement with the notches of the other rails and with the recess 115 in the guide. This structure prevents any fore and aft movement of the interlock plate and thereby locks from movement longitudinally each rail except the one having a notch registering with the slot of the interlocking plate, it being, of course, understood that the slot 133 is cut through the lower part of the interlocking plate as well as through the flat surface.

For convenience in preventing any unintentional movements in the act of gear shifting the plate 129 is formed with the curved portion 135, best shown in Figure 7, bent from its inner-most edge and extended slightly toward the cover plate. A substantially U-shaped plate is shown at 137. This plate may be welded to the forward part of plate 91 and is positioned opposite the curved portion 135. This extension 137 is, as illustrated, carried to a point higher than 135 and has a forwardly and inwardly curved portion 139. Cooperating with these parts 135 and 137 the shift lever has near its lower end a slidable notched block 141.

This block is movable on the lower end of the lever by means of a rod 142 by which the block 141 may be raised or lowered. Figure 7 shows the block 141 in an upper-most position sufficiently to permit it to be moved over the top of projection 135, thus allowing the lower end of the lever 121 to enter the notch of the inner-most rail for shifting into reverse. When in this position the relative position of the block 141 and part 139 permits the middle rail, as well as the inner-most rail, to be engaged by the lever but prevents the outer-most rail from being engaged by the lever. If the block is lowered so that it will engage part 135 and move transversely it will be impossible for the lever to enter the inner-most rail to actuate the reverse gearing. In this position the notch shown in block 141 will receive the inward extension 139 and permit the lever end 121 to engage either the outer-most or the middle rail, under which circumstances shifts may be made into first, second, third and fourth speeds. Under these circumstances the shifts into second, third, and fourth are accomplished by movements of the lever corresponding to the lever movements for low speed, second and third in the present day standard gear shift. These will be the shifts ordinarily used and this arrangement thus makes easy the change from the present to the proposed system.

It will be observed that the inner edge of part 131 curves forwardly and inwardly. This arrangement may be adopted, if desired. When adopted, and when the block is moved to permit a shift to reverse the block in moving forward engages the curved surface at the end of part 139. The end of the lever 121 is thus automatically directed inwardly into the notch of the inner-most rail and prevented from remaining in the second rail and moving the same into second speed. It thus becomes possible to "rock" the vehicle by a simple forward and backward movement of the shift lever without accidentally going into second speed when intending to shift into reverse. This shaping of the projection 139 is thus a convenience for the operation of the car when the block 141 is in its raised position as shown in Figure 7, and, inasmuch as there is no occasion for using second speed when the block is in this position no convenience in operation of the car is sacrificed by so shaping part 139.

By the arrangements described a number of very desirable results are secured. The shift lever and the emergency brake lever may both be positioned near the operator and away from the passenger on the front seat. The large projection of the transmission housing through the floor boards is avoided. Convenient access to the transmission is had by removing a cover on the left side, which carries all the mechanical parts between the shift lever and the gears with the single exception of the yoke 125, which yoke straddles the aligned shafts and the countershaft. It is only necessary to put the transmission into neutral and remove the cover, whereupon the end of the lever leaves the rail notches, the ends of the levers 103 and 113 readily separate from the gear collars and the end of yoke 125 readily slips out from the notch of the inner-most rail. Reassembly is equally simple and easily made.

I claim:

1. In a transmission device, a housing, gearing elements therein for a plurality of driving ratios, a cover on the side of said housing, movable means carried by said cover and cooperating with said gear elements to shift the same, and means to actuate said movable means, said last named means including a shift lever mounted in and projecting through said housing to a position adjacent said cover.

2. In a transmission device, a housing, a cover on the side of said housing, slide rails carried by said cover, movable gear elements in said housing and means operatively connecting said rails and said gear elements together with a shift lever mounted in and projecting through said housing into operative engagement with said rails.

3. In a transmission device, gearing, movable rails associated therewith to effect a plurality of driving ratios, a guide for said rails, said guide carrying a plurality of lugs, a lever, means slidable on said lever to engage the one or the other of said lugs to facilitate gear shifting.

4. In a transmission device, gearing, three movable rails associated therewith to give a plurality of driving ratios, a guide for said rails, oppositely positioned lugs carried by said guide, a lever, means carried by and movable relative to said lever to engage the one or the other of said lugs whereby for any one position of said movable means shifting is restricted to the middle rail and one only of the other rails.

5. The invention defined by claim 4, one of said lugs being shaped to control the lever movement in a way to permit shifting into low and reverse only.

6. In a transmission device, a rail guide, rails slidable thereon, said guide having oppositely positioned lugs, a lever, means movable on and relative to said lever to engage the one or the other of said lugs when the lever is moved transversely, one of said lugs having a transversely curved surface whereby said lever is automatically moved from one shift rail to the next when moved longitudinally.

7. In a transmission device, a housing, shiftable gearing within said housing, a manually operable lever mounted in and extending within said housing, a unitary assembly removably secured to said housing, said assembly including movable parts, certain of said movable parts being in a position to be engaged by said lever when said unitary assembly is mounted in position, operative means between said movable parts and said gearing.

8. In a transmission device, a housing, shiftable gearing within said housing, a manually operable lever pivotally mounted in and extending into said housing, a unitary assembly of operatively connected parts removably secured to said housing, certain of said movable parts being in a position to be engaged by said lever and others of the movable parts engaging said gearing to move the same when said unitary assembly is mounted in position.

9. In a transmission device, a housing, shiftable gearing within said housing, a manually operable lever pivotally mounted in and extending into said housing, a cover plate removably secured to said housing, said cover plate having mounted thereon a plurality of rails, said rails being in a position to be engaged by said lever when the cover plate is in position on said housing, and means operatively connecting said rails and said gearing to shift the latter upon movements of the lever.

10. In a transmission device, a housing, shiftable gear elements therein, a lever projecting into said housing, a cover plate carrying slide rails and levers operatively connected for movement upon movement of the rails, the position of the rails and levers being such that the former are engaged by the lever and the latter engage the gear elements when the cover is positioned on the housing.

11. The invention defined by claim 10, said cover plate being on that side of the housing corresponding to the operator's seat and the lever entering the corresponding side of the top of the housing.

12. In a transmission device, a housing, an upper shaft carrying a slidable gear element, a lower shaft carrying a slidable gear element, a lever mounted in and extending into said housing upon one side of said shafts, a unitary assembly of relatively movable parts removably mounted upon the side of said housing adjacent the said lever, certain of said movable parts being in a position to be engaged by said lever, and other parts in a position to engage said gear elements when said assembly is positioned on said housing.

13. In a transmission device, a housing, an upper shaft carrying a sliding gear, a lower shaft carrying a sliding gear, a third shaft on one side of said housing, said third shaft having a slidable gear, a yoke straddling said first two shafts and engaging the slidable gear on the third shaft, a lever projecting into said housing on the side of said housing opposite said third shaft, a plate removably secured to said housing on its side adjacent said lever, a plurality of movable means carried by said plate to be selectively engaged and moved by said lever, other movable means carried by said plate and operatively connected to certain of said first mentioned movable means and in a position to engage the movable gears of the upper and lower shafts when the plate is in position on said housing, another of said first movable means engaging an end of said yoke.

14. In a change speed mechanism comprising a plurality of gear trains, said gear trains operable to drive at a plurality of speeds including low speed and reverse, means movable to a plurality of positions to render said gear trains individually operable, mechanism movable to two positions, an abutment associated therewith, said mechanism in one of said positions relative to said abutment permitting the said movable means to render effective all forward speeds including low speed and preventing said movable means from rendering effective the gear train for reverse drive, said mechanism in its other position relative to said abutment permitting the movable means to render effective the low speed gear train and the reverse gear train, but preventing the movable means from rendering effective the gears trains for the higher speed ranges.

15. In a change speed transmission for vehicles, gearing adapted to drive in four forward speeds and in reverse, a shift lever movable to render effective each of said drives, means manually movable into two positions, an abutment associated therewith, said means in one of its positions relative to said abutment permitting said lever to render operable any one of the forward speeds but preventing the lever from rendering operable the reverse drive, said means in its other position relative to said abutment permitting the lever to render effective the reverse drive and low speed, but preventing the lever from rendering effective the speed ratios above low speed.

In testimony whereof I affix my signature.

PERRY L. TENNEY.